United States Patent
Kawakami et al.

(10) Patent No.: US 10,734,650 B2
(45) Date of Patent: Aug. 4, 2020

(54) CARBONACEOUS MATERIAL FOR NON-AQUEOUS ELECTROLYTE SECONDARY BATTERY, NEGATIVE ELECTRODE FOR NON-AQUEOUS ELECTROLYTE SECONDARY BATTERY, NON-AQUEOUS ELECTROLYTE SECONDARY BATTERY, AND METHOD FOR PRODUCING CARBONACEOUS MATERIAL FOR NON-AQUEOUS ELECTROLYTE SECONDARY BATTERY

(71) Applicant: KURARAY CO., LTD., Kurashiki-shi (JP)

(72) Inventors: Tomohiro Kawakami, Kurashiki (JP); Sayaka Ide, Kurashiki (JP); Takafumi Izawa, Kurashiki (JP); Taketoshi Okuno, Kurashiki (JP); Jun-Sang Cho, Kurashiki (JP); Hideharu Iwasaki, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/770,866

(22) PCT Filed: Oct. 27, 2016

(86) PCT No.: PCT/JP2016/081928
§ 371 (c)(1),
(2) Date: Apr. 25, 2018

(87) PCT Pub. No.: WO2017/073687
PCT Pub. Date: May 4, 2017

(65) Prior Publication Data
US 2018/0323433 A1    Nov. 8, 2018

(30) Foreign Application Priority Data

Oct. 30, 2015  (JP) ................................ 2015-214335
Oct. 30, 2015  (JP) ................................ 2015-214338

(51) Int. Cl.
| | | |
|---|---|---|
| H01M 4/13 | (2010.01) |
| H01M 4/587 | (2010.01) |
| C01B 32/05 | (2017.01) |
| H01M 10/0525 | (2010.01) |
| H01M 4/02 | (2006.01) |

(52) U.S. Cl.
CPC ............. H01M 4/587 (2013.01); C01B 32/05 (2017.08); H01M 10/0525 (2013.01); *C01P 2002/76* (2013.01); *C01P 2002/78* (2013.01); *C01P 2004/61* (2013.01); *C01P 2006/10* (2013.01); *C01P 2006/12* (2013.01); *C01P 2006/40* (2013.01); *C01P 2006/80* (2013.01); *H01M 2004/021* (2013.01); *H01M 2004/027* (2013.01)

(58) Field of Classification Search
CPC ........ H01M 4/587; H01M 4/583; H01M 4/58; H01M 2004/021; H01M 2004/027; C01B 32/05; C01P 2002/76; C01P 2002/78; C01P 2004/61; C01P 2006/10; C01P 2006/12
See application file for complete search history.

(56) References Cited

U.S. PATENT DOCUMENTS

| | | | |
|---|---|---|---|
| 6,303,249 B1 | 10/2001 | Sonobe et al. | |
| 2010/0266479 A1* | 10/2010 | Tano ................... | H01M 4/587 423/448 |
| 2015/0188137 A1 | 7/2015 | Komatsu et al. | |
| 2015/0229004 A1* | 8/2015 | Numata .............. | H01M 2/1613 320/128 |
| 2015/0263347 A1* | 9/2015 | Imaji .................... | H01M 4/587 429/231.8 |
| 2015/0349331 A1 | 12/2015 | Yamanoi et al. | |

FOREIGN PATENT DOCUMENTS

| | | |
|---|---|---|
| EP | 0 767 505 A1 | 4/1997 |
| EP | 3 370 286 A1 | 9/2018 |
| JP | 9-161801 A | 6/1997 |
| JP | 10-21919 A | 1/1998 |
| JP | 2015-50280 A | 3/2015 |
| JP | 2015-164110 A | 9/2015 |

(Continued)

OTHER PUBLICATIONS

English translation of the International Preliminary Report on Patentability and Written Opinion dated May 11, 2018 in PCT/JP2016/081928.

(Continued)

*Primary Examiner* — Raymond Alejandro
(74) *Attorney, Agent, or Firm* — Oblon, McClelland, Maier & Neustadt, L.L.P.

(57) ABSTRACT

Provided is a carbonaceous material used in a negative electrode of a non-aqueous electrolyte secondary battery that shows favorable charge/discharge capacities and low resistance and having favorable resistance to oxidative degradation. The carbonaceous material has an average interplanar spacing $d_{002}$ of the (002) plane of 0.36 to 0.42 nm calculated by using the Bragg equation according to a wide-angle X-ray diffraction method, a specific surface area of 20 to 65 $m^2/g$ obtained by a nitrogen adsorption BET three-point method, a nitrogen element content of 0.3 mass % or less, an oxygen element content of 2.5 mass % or less, and an average particle diameter of 1 to 4 μm according to a laser scattering method.

11 Claims, No Drawings

(56) References Cited

FOREIGN PATENT DOCUMENTS

| JP | 2015-179666 A | 10/2015 |
| TW | 201545976 A | 12/2015 |
| WO | WO 2014/038491 A1 | 3/2014 |
| WO | WO 2014/103480 A1 | 7/2014 |
| WO | WO 2015/129200 A1 | 9/2015 |

OTHER PUBLICATIONS

International Search Report dated Jan. 31, 2017 in PCT/JP2016/081928 filed Oct. 27, 2016.
Extended European Search Report dated Jun. 18, 2019 in corresponding European Patent Application No. 16859916.5, 8 pages.
Combined Taiwanese Office Action and Search Report dated Oct. 31, 2019 in Patent Application No. 105134919 (with English translation of categories of cited documents), 6 pages.

\* cited by examiner

CARBONACEOUS MATERIAL FOR NON-AQUEOUS ELECTROLYTE SECONDARY BATTERY, NEGATIVE ELECTRODE FOR NON-AQUEOUS ELECTROLYTE SECONDARY BATTERY, NON-AQUEOUS ELECTROLYTE SECONDARY BATTERY, AND METHOD FOR PRODUCING CARBONACEOUS MATERIAL FOR NON-AQUEOUS ELECTROLYTE SECONDARY BATTERY

TECHNICAL FIELD

This patent application claims priority under the Paris Convention based on Japanese Patent Application No. 2015-214335 (filed Oct. 30, 2015) and Japanese Patent Application No. 2015-214338 (filed Oct. 30, 2015), which is incorporated herein by reference in their entirety.

The present invention relates to a carbonaceous material suitable for a negative electrode of a non-aqueous electrolyte secondary battery represented by a lithium ion secondary battery, a negative electrode for a non-aqueous electrolyte secondary battery, a non-aqueous electrolyte secondary battery, and a method for producing a carbonaceous material for a non-aqueous electrolyte secondary battery.

BACKGROUND ART

Lithium ion secondary batteries are widely used for small portable devices such as mobile phones and notebook computers. For a negative electrode material of the lithium ion secondary batteries, non-graphitizable carbon capable of doping (charging) and dedoping (discharging) of lithium in an amount exceeding the theoretical capacity of graphite of 372 mAh/g has been developed (see, e.g., Patent Document 1) and used.

Non-graphitizable carbon can be obtained by using, for example, petroleum pitch, coal pitch, phenolic resin, or plants as a carbon source. Among these carbon sources, plants are raw materials that can be sustained and stably supplied through cultivation, and are attracting attention because of being inexpensively obtainable. Since a carbonaceous material obtained by calcining a plant-derived carbon raw material has a large number of fine pores, favorable charge/discharge capacities are expected (e.g., Patent Documents 1 and 2).

On the other hand, due to the growing interest in environmental problems, lithium-ion secondary batteries are recently developed for on-board use and are coming into practical use.

PRIOR ART DOCUMENTS

Patent Documents

Patent Document 1: Japanese Laid-Open Patent Publication No. 9-161801
Patent Document 2: Japanese Laid-Open Patent Publication No. 10-21919

SUMMARY OF THE INVENTION

Problem to be Solved by the Invention

Especially, a carbonaceous material used in lithium ion secondary batteries for on-board use is required to have favorable charge/discharge capacities as well as resistance to oxidative degradation and is also required to have low resistance for further providing the output characteristics of the battery.

Therefore, an object of the present invention is to provide a carbonaceous material (carbonaceous material for a non-aqueous electrolyte secondary battery) used for a negative electrode of a non-aqueous electrolyte secondary battery (e.g., a lithium ion secondary battery) exhibiting favorable charge/discharge capacities and low resistance and having favorable resistance to oxidative degradation, and a method for producing the same.

Means for Solving Problem

The present inventors have found that the object can be achieved by a carbonaceous material for a non-aqueous electrolyte secondary battery of the present invention described below.

Therefore, the present invention comprises the following preferred aspects.

[1] A carbonaceous material for a non-aqueous electrolyte secondary battery, having an average interplanar spacing $d_{002}$ of the (002) plane within a range of 0.36 to 0.42 nm calculated by using the Bragg equation according to a wide-angle X-ray diffraction method, a specific surface area within a range of 20 to 65 $m^2/g$ obtained by a nitrogen adsorption BET three-point method, a nitrogen element content of 0.3 mass % or less, an oxygen element content of 2.5 mass % or less, and an average particle diameter of 1 to 4 μm according to a laser scattering method.

[2] The carbonaceous material for a non-aqueous electrolyte secondary battery according to [1], wherein the material has a potassium element content of 0.1 mass % or less and an iron element content of 0.02 mass % or less.

[3] The carbonaceous material for a non-aqueous electrolyte secondary battery according to [1] or [2], wherein the material has a true density of 1.4 to 1.7 $g/cm^3$ obtained by a butanol method.

[4] A negative electrode for a non-aqueous electrolyte secondary battery, comprising the carbonaceous material for a non-aqueous electrolyte secondary battery according to any one of [1] to [3].

[5] A non-aqueous electrolyte secondary battery, comprising the negative electrode for a non-aqueous electrolyte secondary battery according to [4].

[6] A method for producing a carbonaceous material for a non-aqueous electrolyte secondary battery, the method comprising: a calcining step of calcining a carbon precursor or a mixture of the carbon precursor and a volatile organic substance under an inert gas atmosphere at 800 to 1400° C.

[7] The method for producing a carbonaceous material for a non-aqueous electrolyte secondary battery according to [6], comprising
the calcining step, and
a post-pulverization step and/or a post-classification step of adjusting the specific surface area of the carbonaceous material obtained by a nitrogen adsorption BET three-point method to 20 to 75 $m^2/g$ through pulverization and/or classification.

[8] The method according to [6] or [7], comprising a pre-pulverization step and/or a pre-classification step of adjusting the specific surface area of the carbon precursor obtained by a nitrogen adsorption BET three-point method to 100 to 800 $m^2/g$ through pulverization and/or classification.

[9] The method according to any of [6] to [8], wherein the carbon precursor is derived from a plant.

[10] The method according to any of [6] to [9], wherein the volatile organic substance is in a solid state at ordinary temperature and has a residual carbon ratio of less than 5 mass %.

[11] The method according to any of [6] to [10], wherein the carbonaceous material has an average interplanar spacing $d_{002}$ of the (002) plane within a range of 0.36 to 0.42 nm calculated by using the Bragg equation according to a wide-angle X-ray diffraction method, a nitrogen element content of 0.3 mass % or less, an oxygen element content of 2.5 mass % or less, and an average particle diameter of 1 to 4 μm according to a laser scattering method.

[12] The method according to any of [6] to [11], wherein the carbonaceous material has a potassium element content of 0.1 mass % or less and an iron element content of 0.02 mass % or less.

[13] The method according to any of [6] to [12], wherein the carbonaceous material has a true density of 1.4 to 1.7 g/cm$^3$ obtained by a butanol method.

Effect of the Invention

The non-aqueous electrolyte secondary battery using the carbonaceous material for a non-aqueous electrolyte secondary battery or the carbonaceous material obtained by the production method of the present invention has favorable charge/discharge capacities and favorable resistance to oxidative degradation and also has low resistance.

MODES FOR CARRYING OUT THE INVENTION

The following is a description illustrating embodiments of the present invention and is not intended to limit the present invention to the following embodiments. In this description, ordinary temperature refers to 25° C.
(Carbonaceous Material for Non-Aqueous Electrolyte Secondary Battery)

A carbonaceous material for a non-aqueous electrolyte secondary battery of this embodiment is obtained by calcining a carbon precursor or a mixture of the carbon precursor and a volatile organic substance under an inert gas atmosphere at 800 to 1400° C., for example. When the carbonaceous material for a non-aqueous electrolyte secondary battery is obtained in this way, the carbonaceous material can sufficiently be carbonized and can be obtained as a carbonaceous material having fine pores suitable for an electrode material.

The carbon precursor is a precursor of a carbonaceous material supplying a carbon component at the time of production of a carbonaceous material and can be produced by using a plant-derived carbon material (hereinafter sometimes referred to as "plant-derived char") as a raw material. Char generally refers to a non-melting/non-softening powdery solid rich in carbon obtained when coal is heated; however, in this description, the char also refers to a non-melting/non-softening powdery solid rich in carbon obtained by heating an organic substance. The carbon precursor derived from a plant is advantageous in environmental and economic aspects from the viewpoint of carbon neutral and easy availability.

Plants used as raw materials for plant-derived char (hereinafter sometimes referred to as "plant raw materials") are not particularly limited. Examples comprise coconut shells, coffee beans, tea leaves, sugarcane, fruits (e.g., mandarin oranges, bananas), straws, shells, broad-leaved trees, needle-leaved trees, and bamboo. These examples comprise a waste (e.g., used tea leaves) after being used for the original purpose, or a portion of the plant raw material (e.g., banana or mandarin orange peel). These plants can be used alone or in combination of two or more kinds. Among these plants, coconut shells are preferable due to easy availability in large amount and industrial advantages.

The coconut shells are not particularly limited and may be, for example, coconut shells of palm trees (oil palm), coconut trees, Salak, and double coconuts. These coconut shells can be used alone or in combination. Coconut shells of coconut trees and palm trees are biomass waste generated in a large amount after being used for food, detergent raw material, biodiesel oil raw material, etc., and are particularly preferable.

Although a method of producing a char from a plant raw material is not particularly limited, for example, the plant raw material can be subjected to a heat treatment (hereinafter sometimes referred to as "pre-calcining") under an inert gas atmosphere at 300° C. or higher for the production. The raw material can also be obtained in the form of char (e.g., coconut shell char).

The carbonaceous material produced from the plant-derived char can be doped with a large amount of an active material and is therefore basically suitable for a negative electrode material of a non-aqueous electrolyte secondary battery. However, the plant-derived char contains a large amount of metal elements contained in the plant. For example, the coconut shell char contains about 0.3 mass % potassium element and about 0.1 mass % iron element. If such a carbonaceous material containing a large amount of the metallic elements is used as a negative electrode, the electrochemical characteristics and safety of the non-aqueous electrolyte secondary battery may adversely be affected.

The plant-derived char also contains alkali metals other than potassium (e.g., sodium), alkaline earth metals (e.g., magnesium, calcium), transition metals (e.g., iron, copper), and other metals. If the carbonaceous material contains these metals, impurities are eluted into an electrolytic solution during dedoping from the negative electrode of the non-aqueous electrolyte secondary battery, which may have an unfavorable influence on battery performance and impair safety.

Furthermore, it has been confirmed in studies by the present inventors that blockage of fine pores of the carbonaceous material by an ash content may occur and adversely affect the charge/discharge capacities of the battery.

Therefore, regarding such an ash content (alkali metal, alkaline earth metal, transition metal, and other elements) contained in the plant-derived char, the ash content is desirably reduced by a demineralization treatment before a calcining step for obtaining the carbonaceous material. From such a viewpoint, a production method of the present invention may comprise a demineralization step of performing the demineralization treatment of a carbon material, for example, the plant-derived char, to obtain a carbon precursor. The demineralization method is not particular limited and may be implemented by using, for example, a method of extracting and demineralizing a metal component by using acidic water containing a mineral acid such as hydrochloric acid and sulfuric acid, an organic acid such as acetic acid and formic acid, etc. (liquid-phase demineralization), or a method of demineralization through exposure to a high-temperature gas phase containing a halogen compound such as hydrogen chloride (gas-phase demineralization). Although not intended to limit the demineralization method to be applied, description will hereinafter be made of the gas-phase demineralization, which is preferable since a drying treatment is not required after demineralization. The demineralized plant-derived char will hereinafter also be referred to as a "plant-derived char carbon precursor".

For the gas-phase demineralization, it is preferable to perform a heat treatment of the plant-derived char in a gas phase containing a halogen compound. The halogen compound is not particularly limited, and examples thereof can comprise fluorine, chlorine, bromine, iodine, hydrogen fluoride, hydrogen chloride, hydrogen bromide, iodine bromide, chlorine fluoride (ClF), iodine chloride (ICl), iodine bromide (IBr), and bromine chloride (BrCl). Compounds generating these halogen compounds by thermal decomposition, or a mixture thereof are also usable. From the viewpoints of the stability of the halogen compound to be used and the supply stability thereof, hydrogen chloride is preferable.

For the gas-phase demineralization, the halogen compound and an inert gas may be mixed and used. The inert gas is not particularly limited as long as the gas is not reactive with the carbon component constituting the plant-derived char. For example, the gas can be nitrogen, helium, argon, and krypton, as well as mixtures thereof. From the viewpoints of supply stability and economy, nitrogen is preferable.

In the gas-phase demineralization, the mixing ratio of the halogen compound and the inert gas is not limited as long as sufficient demineralization can be achieved and, for example, from the viewpoints of safety, economy, and persistence in carbon, the amount of the halogen compound relative to the inert gas is preferably 0.01 to 10 vol %, more preferably 0.05 to 8 vol %, further preferably 0.1 to 5 vol %.

The temperature of the gas-phase demineralization may be varied depending on the plant-derived char that is the object of the demineralization and, from the viewpoint of obtaining desired nitrogen element content and oxygen element content, for example, the demineralization can be performed at 500 to 950° C., preferably 600 to 940° C., more preferably 650 to 940° C., further preferably 850 to 930° C. If the demineralization temperature is too low, demineralization efficiency may decrease so that the demineralization may not sufficiently be performed. If the demineralization temperature is too high, activation by the halogen compound may occur.

The time of the gas-phase demineralization is not particularly limited and is, for example, 5 to 300 minutes, preferably 10 to 200 minutes, more preferably 20 to 150 minutes, from the viewpoints of economic efficiency of reaction equipment and structural retention of the carbon content.

In the gas-phase demineralization in this embodiment, potassium, iron, etc. contained in the plant-derived char are removed. The potassium element content contained in the carbon precursor obtained after the gas-phase demineralization is preferably 0.1 mass % or less, more preferably 0.05 mass % or less, further preferably 0.03 mass % or less, from the viewpoints of increasing a dedoping capacity and decreasing a non-dedoping capacity. The iron element content contained in the carbon precursor obtained after the gas-phase demineralization is preferably 0.02 mass % or less, more preferably 0.015 mass % or less, further preferably 0.01 mass % or less from the viewpoints of increasing the dedoping capacity and decreasing the non-dedoping capacity. When the contents of the potassium element and the iron element contained in the carbon precursor become larger, the dedoping capacity may be decreased in the non-aqueous electrolyte secondary battery using the obtained carbonaceous material. Additionally, the non-dedoping capacity may be increased. Furthermore, when these metal elements are eluted into the electrolytic solution and reprecipitated, a short circuit may occur and may cause a significant problem in safety of the non-aqueous electrolyte secondary battery. It is particularly preferable that the plant-derived char carbon precursor after the gas-phase demineralization does not substantially contain the potassium element and the iron element. Details of measurement of the contents of the potassium element and the iron element are as described in Examples, and a fluorescent X-ray analyzer (e.g., "LAB CENTER XRF-1700" manufactured by Shimadzu Corporation) can be used. The potassium element content and the iron element content contained in the carbon precursor are normally 0 mass % or more.

The particle diameter of the plant-derived char to be subjected to the gas-phase demineralization is not particularly limited; however, an excessively small particle diameter may make it difficult to separate the gas phase containing removed potassium etc. and the plant-derived char, and therefore, a lower limit of the average value (D50) of the particle diameter is preferably 100 µm or more, more preferably 300 µm or more, further preferably 500 µm or more. An upper limit of the average value of the particle diameter is preferably 10000 µm or less, more preferably 8000 µm or less, further preferably 5000 µm or less from the viewpoint of fluidity in a mixed gas stream. Details of measurement of the particle diameter are as described in Examples and, for example, a laser scattering method can be performed by using a particle size distribution measuring device (e.g., "SALD-3000S" manufactured by Shimadzu Corporation, "Microtrac MT3000" manufactured by Nikkiso).

An apparatus used for the gas-phase demineralization is not particularly limited as long as the apparatus is capable of heating while mixing the plant-derived char and the gas phase containing a halogen compound. For example, a fluidized furnace can be used for using an intra-layer flow system of a continuous type with a fluidized bed etc. or a batch type. Although a supply amount (flow rate) of the gas phase is not particularly limited, from the viewpoint of fluidity in a mixed gas stream, for example, the gas phase is supplied at preferably 1 ml/min or more, more preferably 5 ml/min or more, and further preferably 10 ml/min or more per 1 g of the plant-derived char.

In the gas-phase demineralization, after the heat treatment in an inert gas atmosphere containing a halogen compound (hereinafter sometimes referred to as a "halogen heat treatment"), preferably, a heat treatment in the absence of a halogen compound (hereinafter sometimes referred to as a "gas-phase deacidification treatment") is further performed. Since halogen is contained in the plant-derived char due to the halogen heat treatment, the halogen contained in the plant-derived char is preferably removed by the gas-phase deacidification treatment. Specifically, the gas-phase deacidification treatment is performed in an inert gas atmosphere containing no halogen compound at, for example, 500° C. to 940° C., preferably 600° C. to 940° C., more preferably 650° C. to 940° C., further preferably 850° C. to 930° C., and the temperature of the heat treatment is preferably the same as or higher than the temperature of the first heat treatment. For example, halogen can be removed by performing a heat treatment with the supply of the halogen compound being blocked after the halogen heat treatment. The time of the gas-phase deoxidation treatment is also not particularly limited and is preferably 5 to 300 minutes, more preferably 10 to 200 minutes, further preferably 10 to 100 minutes.

The carbon precursor can be adjusted in average particle diameter through a pulverization step and/or a classification step as needed. The pulverization step and/or the classification step is preferably performed after the demineralization treatment. In the following description, the pulverization step and the classification step performed before the calcining step are also referred to as a pre-pulverization step and a pre-classification step, respectively. The pulverization step and the classification step performed after the calcining step are also referred to as a post-pulverization step and a post-classification step. In the production method of the present invention, it is preferable to perform the pre-pulverization step and the pre-classification step after the demineralization treatment.

In a preferable embodiment of the production method of the present invention, at the pulverization step and/or the classification step (the pre-pulverization step and the pre-classification step), the carbon precursor is preferably pulverized and/or classified before the calcining step such that the average particle diameter of the carbonaceous material after the calcining step falls within a range of, for example, 1 to 4 μm, from the viewpoint of coatability during electrode fabrication. Therefore, the average particle diameter (D50) of the carbonaceous material of this embodiment is adjusted to the range of 1 to 4 μm, for example. Only the pulverization step or the classification step may be performed, or both the pulverization step and the classification step may be performed.

The pulverization step and/or the classification step (the post-pulverization step and/or the post-classification step) can be performed after the calcining step of the carbon precursor to adjust the average particle diameter of the carbonaceous material within the range.

In another preferred embodiment of the production method of the present invention in which the post-pulverization step and/or the post-classification step are performed, at the pre-pulverization step and/or the pre-classification step before the calcining step, the carbon precursor is preferably pulverized and/or classified such that the average particle diameter (D50) of the carbon precursor falls within a range of 5 to 800 μm from the viewpoint of uniformity during calcination. Therefore, the average particle diameter (D50) of the carbon precursor of this embodiment is adjusted to the range of 5 to 800 μm, for example. As long as the carbon precursor having an average particle diameter within the range can be obtained, only the pre-pulverization step or the pre-classification step may be performed, or both the pre-pulverization step and the pre-classification step may be performed. When the average particle diameter is 5 μm or more, fine powder hardly scatters in a calcining furnace during calcination, thereby resulting in an excellent recovery rate of the generated carbonaceous material as well as a suppression of an apparatus load. On the other hand, when the average particle diameter is 800 μm or less, the process of gas emitted from the particles during calcination is hardly elongated, resulting in favorable uniformity on the inside and the outside of the carbonaceous material. From such a viewpoint, the average particle diameter is preferably 800 μm or less, more preferably 700 μm or less, further preferably 600 μm or less, particularly preferably 500 μm or less, most preferably 400 μm or less.

In the preferred embodiment described above, by performing the pre-pulverization step and/or the pre-classification step and further performing the post-pulverization step and/or the post-classification step, the particles adjusted in particle size by the pre-pulverization are supplied so that a post-pulverization property is stabilized, which not only facilitates adjustment of particles having a desired particle size distribution but also provides an improvement in recovery rate due to stabilization of the particle size distribution. Furthermore, the post-classification makes it easier to perform the calcination such that the desired particle size distribution is achieved.

Therefore, in the present invention, the pulverization step and/or the classification step may be performed before the calcining step, after the calcining step, or both before and after the calcining step.

When the average particle diameter of the carbonaceous material is less than 1 μm, since an increase in fine powder increases the specific surface area, a higher reactivity with an electrolytic solution increases an irreversible capacity that is a capacity not to be discharged even when charged, and therefore, the capacity of the positive electrode may be wasted in an increased proportion. Additionally, when a negative electrode is produced by using the obtained carbonaceous material, smaller gaps are formed in the carbonaceous material, so that migration of lithium ions in the electrolytic solution may be suppressed. The average particle diameter (D50) of the carbonaceous material of the present invention is preferably 1 μm or more, more preferably 1.5 μm or more, further preferably 1.7 μm or more. On the other hand, the average particle diameter of 4 μm or less is preferable since a small diffusion free path of lithium ions in the particles enables rapid charging and discharging. Furthermore, in lithium ion secondary batteries, it is important to increase an electrode area for improvement of input/output characteristics, and therefore, a coating thickness of an active material applied to a collector plate needs to be reduced at the time of electrode fabrication. To reduce the coating thickness, it is necessary to reduce the particle diameter of the active material. From such a viewpoint, the average particle diameter is preferably 4 μm or less, more preferably 3.5 μm or less, further preferably 3.2 μm or less, particularly preferably 3 μm or less, most preferably 2.8 μm or less.

The plant-derived char carbon precursor shrinks by about 0 to 20% depending on conditions of main calcination described later. Therefore, when the pulverization step and/or the classification step is performed only before the calcining step, the average particle diameter of the plant-derived char carbon precursor is preferably adjusted to a particle diameter larger by about 0 to 20% than a desired post-calcining average particle diameter so as to achieve the post-calcining average particle diameter of 1 to 4 μm. Therefore, when the pulverization step and/or the classification step is performed only before the calcining step, pulverization and/or classification is preferably performed such that the average particle diameter after pulverization and/or classification is preferably 1 to 5 μm, more preferably 1.1 to 4.4 μm.

Since the carbon precursor does not melt even when a heat treatment step described later is performed, the pulverization step is not particularly limited in terms of order as long as the pulverization step is performed after the demineralization step. From the viewpoint of reduction in specific surface area of the carbonaceous material, the pulverization step is preferably performed before the calcining step. This is because if the plant-derived char is mixed with a volatile organic substance as necessary and calcined before pulverization, the specific surface area may not sufficiently be reduced. However, it is not intended to exclude performing the pulverization step after the calcining step.

A pulverizing apparatus used for the pulverization step is not particularly limited and, for example, a jet mill, a ball mill, a bead mill, a hammer mill, or a rod mill can be used. In terms of the efficiency of pulverization, a system performing pulverization through contact between particles such as a jet mill has a longer pulverization time and a lower volume efficiency, so that a system performing pulverization in the presence of a pulverization media such as a ball mill and a bead mill is preferable, and the use of a bead mill is preferable from the viewpoint of avoiding impurities mixed in from the pulverization media, while the use of a ball mill is preferable from the viewpoint of equipment load.

In one embodiment of the present invention, the classification step can be performed after the pulverization step. By the classification step after the pulverization step, the average particle diameter of the carbonaceous material can more accurately be adjusted. For example, particles having a particle diameter of 1 μm or less can be removed, and coarse particles having a particle diameter of 800 μm or more can be removed.

Although not particularly limited, examples of a classification method can comprise classification using a sieve, wet classification, and dry classification. Examples of wet classifiers can comprise classifiers utilizing principles of gravity classification, inertia classification, hydraulic classification, and centrifugal classification. Examples of dry classifiers can comprise classifiers utilizing principles of sedimentation classification, mechanical classification, centrifugal classification, etc.

In this embodiment, the specific surface area of the carbon precursor after pulverization and/or classification (the pre-pulverization step and/or the pre-classification step) is preferably 100 to 800 $m^2/g$, more preferably 200 to 700 $m^2/g$, for example, 200 to 600 $m^2/g$. The pulverization step and/or the classification step is preferably performed such that the carbon precursor having a specific surface area within the range is obtained. As long as the carbon precursor having a specific surface area within the range can be obtained, only the pulverization step or the classification step may be performed, or both the pulverization step and the classification step may be performed. If the specific surface area is too small, the fine pores of the carbonaceous material may not sufficiently be reduced even after the calcining step described later, and the hygroscopicity of the carbonaceous material may hardly be reduced. If moisture is present in the carbonaceous material, problems may be caused by generation of an acid accompanying hydrolysis of the electrolytic solution and generation of a gas due to electrolysis of water. Additionally, the oxidation of the carbonaceous material may progress under the air atmosphere and may cause a significant change in battery performance. If the specific surface area becomes too large, the specific surface area of the carbonaceous material does not become small even after the calcining step described later, and the utilization efficiency of lithium ions may decrease in the non-aqueous electrolyte secondary battery. The specific surface area of the carbon precursor can also be adjusted by controlling the temperature of the gas-phase demineralization. In this description, the specific surface area means a specific surface area (BET specific surface area) determined by a BET method (nitrogen adsorption BET three-point method). Specifically, the specific surface area can be measured by using a method described later.

In one embodiment of the present invention, the method for producing a carbonaceous material for a non-aqueous electrolyte secondary battery of the present embodiment comprises a step of calcining a carbon precursor or a mixture of the carbon precursor and a volatile organic substance under an inert gas atmosphere at 800 to 1400° C. to obtain the carbonaceous material (hereinafter sometimes referred to as a "calcining step"). By comprising the calcining step, the non-aqueous electrolyte secondary battery using the obtained carbonaceous material has favorable discharge capacity and favorable resistance to oxidative deterioration. The calcining step is preferably performed after the demineralization step and preferably performed after the demineralization step, the pre-pulverization step, and the pre-classification step.

By calcining a carbon precursor or a mixture of the carbon precursor and a volatile organic substance, the carbonaceous material of the present embodiment is obtained. By mixing and calcining the carbon precursor and the volatile organic substance, the specific surface area of the obtained carbonaceous material can be reduced to achieve the specific surface area suitable for the negative electrode material for the non-aqueous electrolyte secondary battery. Furthermore, an adsorption amount of carbon dioxide to the carbonaceous material can be adjusted.

Although details are not clarified in terms of the mechanism in which the specific surface area of the carbonaceous material is reduced by mixing and calcining the carbon precursor and the volatile organic substance, this can be thought as follows. However, the present invention is not limited by the following description. It is thought that a carbonaceous coating film obtained by a heat treatment of a volatile organic substance is formed on the surface of the plant-derived char carbon precursor by mixing and calcining the plant-derived char carbon precursor and the volatile organic substance. The carbonaceous coating film reduces the specific surface area of the carbonaceous material generated from the plant-derived char carbon precursor and suppresses a formation reaction of a coating film called SEI (Solid Electrolyte Interphase) due to a reaction between the carbonaceous material and lithium, and therefore, it can be expected that the irreversible capacity is reduced. Additionally, since the generated carbonaceous coating film can be doped and dedoped with lithium, an effect of increasing the capacity can also be expected.

Although not particularly limited, examples of the volatile organic substance comprise thermoplastic resins and low-molecular organic compounds. Specifically, examples of the thermoplastic resins can comprise polystyrene, polyethylene, polypropylene, poly(meth)acrylic acid, poly(meth) acrylic acid ester, etc. In this description, (meth)acryl is a generic term for acryl and methacryl. Examples of the low-molecular organic compounds can comprise toluene, xylene, mesitylene, styrene, naphthalene, phenanthrene, anthracene, pyrene, etc. Since it is preferable that the substance volatilizes under the calcining temperature and does not oxidize or activate the surface of the carbon precursor when thermally decomposed, the thermoplastic resin is preferably polystyrene, polyethylene, or polypropylene. From the viewpoint of safety, it is preferable that the low-molecular organic compound has low volatility under ordinary temperature and, therefore, naphthalene, phenanthrene, anthracene, pyrene etc. are preferable.

In one embodiment of the present invention, examples of the thermoplastic resins can comprise an olefin-based resin, a styrene-based resin, and a (meth)acrylic acid-based resin. Examples of the olefin-based resin can comprise polyethylene, polypropylene, random copolymers of ethylene and propylene, block copolymers of ethylene and propylene, etc. Examples of the styrene-based resin can comprise polystyrene, poly(α-methylstyrene), copolymers of styrene and (meth)acrylic acid alkyl ester (with an alkyl group having the carbon number of 1 to 12, preferably 1 to 6), etc.

Examples of the (meth)acrylic acid-based resin can comprise polyacrylic acid, polymethacrylic acid, and (meth)acrylic acid alkyl ester polymers (with an alkyl group having the carbon number of 1 to 12, preferably 1 to 6), etc.

In one embodiment of the present invention, for example, a hydrocarbon compound having the carbon number of 1 to 20 can be used as the low-molecular organic compound. The carbon number of the hydrocarbon compound is preferably 2 to 18, more preferably 3 to 16. The hydrocarbon compound may be a saturated hydrocarbon compound or an unsaturated hydrocarbon compound and may be a chain hydrocarbon compound or a cyclic hydrocarbon compound. In the case of the unsaturated hydrocarbon compound, the unsaturated bond may be a double bond or a triple bond, and the number of unsaturated bonds contained in one molecule is not particularly limited. For example, the chain hydrocarbon compound is an aliphatic hydrocarbon compound and can be a linear or branched alkane, alkene, or alkyne. The cyclic hydrocarbon compound can be an alicyclic hydrocarbon compound (e.g., cycloalkane, cycloalkene, cycloalkyne) or an aromatic hydrocarbon compound. Specifically, the aliphatic hydrocarbon compound can be methane, ethane, propane, butane, pentane, hexane, octane, nonane, decane, ethylene, propylene, butene, pentene, hexene, acetylene, etc. The alicyclic hydrocarbon compound can be cyclopentane, cyclohexane, cycloheptane, cyclooctane, cyclononane, cyclopropane, cyclopentene, cyclohexene, cycloheptene, cyclooctene, decalin, norbornene, methylcyclohexane, and norbornadiene. The aromatic hydrocarbon compound can be a monocyclic aromatic compound such as benzene, toluene, xylene, mesitylene, cumene, butylbenzene, styrene, α-methylstyrene, o-methylstyrene, m-methylstyrene, p-methylstyrene, vinylxylene, p-tert-butylstyrene, and ethylstyrene, and a condensed polycyclic aromatic compound with three to six rings such as naphthalene, phenanthrene, anthracene, and pyrene, and is preferably the condensed polycyclic aromatic compounds, more preferably naphthalene, phenanthrene, anthracene or pyrene. The hydrocarbon compound may have an arbitrary substituent. Although not particularly limited, the substituent can be, for example, an alkyl group having the carbon number of 1 to 4 (preferably an alkyl group having the carbon number of 1 to 2), an alkenyl group having the carbon number of 2 to 4 (preferably an alkenyl having the carbon number of 2), and a cycloalkyl group having the carbon number of 3 to 8 (preferably a cycloalkyl group having the carbon number of 3 to 6).

From the viewpoint of ease of mixing and avoidance of uneven distribution (uniform dispersion), the volatile organic substance is preferably in a solid state at ordinary temperature and is more preferably a thermoplastic resin that is solid at ordinary temperature such as polystyrene, polyethylene, or polypropylene, or a low-molecular organic compound that is solid at ordinary temperature such as naphthalene, phenanthrene, anthracene, or pyrene, for example. Since it is preferable that the substance does not oxidize or activate the surface of the plant-derived char carbon precursor when volatilized and thermally decomposed under the calcining temperature, the thermoplastic resin is preferably an olefin-based resin and a styrene-based resin, more preferably polystyrene, polystyrene, and polypropylene. The low-molecular organic compound is further preferably less volatile under ordinary temperature for safety and is therefore preferably a hydrocarbon compound having the carbon number of 1 to 20, more preferably a condensed polycyclic aromatic compound, further preferably naphthalene, phenanthrene, anthracene, or pyrene. Moreover, from the viewpoint of ease of mixing with the carbon precursor, the volatile organic substance is preferably the thermoplastic resin, more preferably the olefin-based resin and the styrene-based resin, further preferably polystyrene, polyethylene, and polypropylene, particularly preferably polystyrene and polyethylene.

From the viewpoint of stable operation of a calcining apparatus, the volatile organic substance is an organic substance having a residual carbon ratio of preferably less than 5 mass %, more preferably less than 3 mass %. The residual carbon ratio in the present invention is preferably a residual carbon ratio in the case of ashing at 800° C. The volatile organic substance is preferably a substance generating a volatile substance (e.g., a hydrocarbon-based gas or a tar component) capable of reducing the specific surface area of the carbon precursor produced from the plant-derived char. From the viewpoint of maintaining the properties of the carbonaceous material generated after calcination, the residual carbon ratio is preferably less than 5 mass %. When the residual carbon ratio is less than 5%, carbonaceous materials different in local properties are hardly generated.

The residual carbon ratio can be measured by quantifying a carbon content of an ignition residue after ignition of a sample in an inert gas. With regard to the ignition, about 1 g of a volatile organic substance (the accurate mass is defined as $W_1$ (g)) is put into a crucible and the crucible is heated in an electric furnace at the temperature increase rate of 10° C./min from ordinary temperature to 800° C. while flowing 20 liters of nitrogen per minute and is then ignited at 800° C. for 1 hour. A residue in this case is regarded as the ignition residue, and the mass thereof is defined as $W_2$ (g).

Subsequently, for the ignition residue, elemental analysis is performed in accordance with the method defined in JIS M 8819 to measure a mass proportion $P_1$ (%) of carbon. A residual carbon ratio $P_2$ (mass %) can be calculated by following Eq. I.

[Mathematical 1]

$$P_2 = P_1 \times \frac{W_2}{W_1} \qquad (I)$$

In the case of mixing the carbon precursor and the volatile organic substance, although the mass ratio of the carbon precursor and the volatile organic substance in the mixture is not particularly limited, the mass ratio of the carbon precursor and the volatile organic substance is preferably 97:3 to 40:60. The mass ratio of the carbon precursor and the volatile organic substance in the mixture is more preferably 95:5 to 60:40, further preferably 93:7 to 80:20. For example, when the mass ratio of the carbon precursor and the volatile organic substance is within the range, adjustment to a desired specific surface area is facilitated. For example, when the volatile organic substance is 3 parts by mass or more, the specific surface area can sufficiently be reduced. When the amount of the volatile organic substance is 60 parts by mass or less, the effect of reducing the specific surface area is not saturated and the volatile organic substance is hardly excessively consumed, which is industrially advantageous.

Mixing of the carbon precursor and the volatile organic substance liquid or solid at ordinary temperature may be performed either before the pre-pulverization step or after the pre-pulverization step.

In the case of mixing the carbon precursor and the volatile organic substance before the pre-pulverization step, pulverization and mixing can be performed at the same time by weighing and supplying the carbon precursor and the volatile organic substance that is liquid or solid at ordinary temperature simultaneously to the pulverizing apparatus. In the case of using the volatile organic substance that is gaseous at ordinary temperature, a method of mixing with the plant-derived char carbon precursor can comprise allowing a non-oxidizing gas containing the gaseous volatile organic substance to flow into a heat treatment apparatus containing the plant-derived char carbon precursor for thermal decomposition.

In the case of mixing after the pre-pulverization step, a mixing method can be implemented by using any known mixing method that is a technique in which both are uniformly mixed. Although the volatile organic substance solid at ordinally temperature is preferably mixed in a form of particles, the particle shape and the particle diameter are not particularly limited. From the viewpoint of uniformly dispersing the volatile organic substance in the pulverized carbon precursor, the average particle diameter of the volatile organic substance is preferably 0.1 to 2000 μm, more preferably 1 to 1000 μm, further preferably 2 to 600 μm.

The carbon precursor or mixture described above may contain a component other than the carbon precursor and the volatile organic substance. For example, the mixture can contain natural graphite, artificial graphite, a metal-based material, an alloy-based material, or an oxide-based material. The content of the other component is not particularly limited and is preferably 50 parts by mass or less, more preferably 30 parts by mass or less, further preferably 20 parts by mass or less, most preferably 10 parts by mass or less based on 100 parts by mass of the carbon precursor or the mixture of the carbon precursor and the volatile organic substance.

At the calcining step in the production method of the present embodiment, the carbon precursor or the mixture of the carbon precursor and the volatile organic substance is preferably calcined at 800 to 1400° C. The present invention also provides a method for producing a carbonaceous material for a non-aqueous electrolyte secondary battery, comprising a calcining step of calcining a carbon precursor or a mixture of the carbon precursor and a volatile organic substance under an inert gas atmosphere at 800 to 1400° C. to obtain the carbonaceous material.

The calcining step may comprise (a) a calcining step of calcining the pulverized carbon precursor or mixture at 800 to 1400° C. for main calcination, or may comprise (b) a calcining step of preliminarily calcining the pulverized carbon precursor or mixture at 350° C. or higher and less than 800° C. and subsequently performing main calcination at 800 to 1400° C.

If the calcining step (a) is performed, it is thought that coating of the carbon precursor with the tar component and the hydrocarbon-based gas occurs at the step of main calcination. If the calcining step (b) is performed, it is thought that coating of the carbon precursor with the tar component and the hydrocarbon-based gas occurs at the step of preliminary calcination.

An example of procedures of the preliminary calcination and the main calcination will hereinafter be described as an embodiment of the present invention; however, the present invention is not limited thereto.

(Preliminary Calcination)

The preliminary calcining step in this embodiment can be performed, for example, by calcining the pulverized carbon precursor or mixture at 350° C. or higher and less than 800° C. Volatile matters (such as $CO_2$, CO, $CH_4$, and $H_2$) and the tar component can be removed by the preliminary calcining step. The generation of the volatile matters and the tar component at the main calcining step performed after the preliminary calcining step can be reduced, and a burden on a calcining machine can be reduced.

The preliminary calcining step is preferably performed at 350° C. or higher, more preferably at 400° C. or higher. The preliminary calcining step can be performed according to a usual preliminary calcining procedure. Specifically, the preliminary calcination can be performed in an inert gas atmosphere. Examples of the inert gas can comprise nitrogen, argon, etc. The preliminary calcination may be performed under reduced pressure and can be performed at 10 kPa or less, for example. The preliminary calcination is not particularly limited in terms of time and can be performed, for example, within the range of 0.5 to 10 hours, more preferably 1 to 5 hours.

(Main Calcination)

The main calcining step can be performed according to a usual main calcining procedure. By performing the main calcination, a carbonaceous material for a non-aqueous electrolyte secondary battery can be obtained.

A specific temperature of the main calcining step is preferably 800 to 1400° C., more preferably 1000 to 1350° C., further preferably 1100 to 1300° C. The main calcination is performed under an inert gas atmosphere. Examples of the inert gas can comprise nitrogen, argon, etc., and the main calcination can be performed in an inert gas containing a halogen gas. The main calcining step can be performed under reduced pressure and can be performed at 10 kPa or less, for example. The main calcining step is not particularly limited in terms of execution time and can be performed, for example, for 0.05 to 10 hours, preferably 0.05 to 8 hours, more preferably 0.05 to 6 hours.

As described above, a calcined material (carbonaceous material) may be adjusted to the predetermined average particle diameter by performing the pulverization step and/or the classification step (the post-pulverization step and/or the post-classification step) after the calcining step. In the present invention, performing the pulverization step and/or the classification step after the calcining step has an advantage in terms of process control such as absence of scattering of fine powder during firing.

Therefore, the production method of the present invention preferably comprises the calcining step, and the post-pulverization step and/or the post-classification step of adjusting the specific surface area of the calcined material (carbonaceous material) obtained at the calcining step to 20 to 75 $m^2/g$ through pulverization and/or classification. After the calcining step, the calcined material (carbonaceous material) can have the average particle diameter adjusted by the post-pulverization step and/or post-classification step. In the present invention, performing the post-pulverization step and/or the post-classification step after the calcining step is preferable from the viewpoint of process control because of absence of scattering of fine powder during firing etc., and when the obtained carbonaceous material is used for a non-aqueous electrolyte secondary battery, the production method of the present invention comprising the post-pulverization step and/or the post-classification step after the calcining step improves the effective surface area of the obtained carbonaceous material brought into contact with the electrolytic solution so that low resistance can be achieved.

The specific surface area of the carbonaceous material of the present invention is 20 $m^2/g$ to 65 $m^2/g$, preferably 22 m²/g to 65 m²/g, more preferably 25 m²/g to 60 m²/g, further preferably 25 m²/g to 55 m²/g, for example 26 m²/g to 50 m²/g. When the specific surface area is too small, an adsorption amount of lithium ions to the carbonaceous material decreases, and the charge capacity of the non-aqueous electrolyte secondary battery may be reduced. When the specific surface area is too high, lithium ions react on the surface of the carbonaceous material and are consumed, so that the utilization efficiency of lithium ions becomes lower.

In a preferable embodiment of the production method of the present invention, the specific surface area of the carbonaceous material obtained by the production method of the present invention is preferably 20 m²/g to 75 m²/g, more preferably 22 m²/g to 73 m²/g, further preferably 24 m²/g to 71 m²/g, further preferably 26 m²/g to 70 m²/g, particularly preferably from 26 m²/g to 60 m²/g, most preferably from 26 m²/g to 50 m²/g. In the production method of the present invention, the post-pulverization step and/or the post-classification step is preferably performed such that the carbon precursor having a specific surface area within the range is obtained. When the specific surface area is too small, an adsorption amount of lithium ions to the carbonaceous material decreases, and the charge capacity of the non-aqueous electrolyte secondary battery may be reduced. When the specific surface area is too high, lithium ions react on the surface of the carbonaceous material and are consumed, so that the utilization efficiency of lithium ions may become lower.

Other method of adjusting the specific surface area to the range are not limited at all and, for example, a method of adjusting the calcining temperature and calcining time of the carbon precursor resulting in the carbonaceous material can be used. Specifically, since the specific surface area tends to decrease when the calcining temperature is made higher or the calcining time is made longer, the calcining temperature and the calcining time may be adjusted to obtain the specific surface area within the range. A method of mixing and calcining with a volatile organic substance may be used. As described above, it is thought that a carbonaceous coating film obtained by a heat treatment of a volatile organic substance is formed on the surface of the carbon precursor by mixing and calcining the carbon precursor and the volatile organic substance. It is thought that the carbonaceous coating film reduces the specific surface area of the carbonaceous material obtained from the carbon precursor. Therefore, by adjusting the amount of the volatile organic substance to be mixed, the specific surface area of the carbonaceous material can be adjusted to the range.

In a preferable form of the production method of the present invention, the average particle diameter (D50) of the carbonaceous material obtained by the production method of the present invention is preferably in the range of 1 to 4 μm from the viewpoint of coatability during electrode fabrication. Therefore, the average particle diameter (D50) of the carbonaceous material of this embodiment is adjusted to the range of 1 to 4 μm, for example. As long as the carbonaceous material having an average particle diameter within the range can be obtained, only the post-pulverization step or the post-classification step may be performed, or both the post-pulverization step and the post-classification step may be performed. When the average particle diameter is less than 1 μm, since increased fine powder increases the specific surface area, a higher reactivity with an electrolytic solution increases an irreversible capacity that is a capacity not to be discharged even when charged, and therefore, the capacity of the positive electrode may be wasted in an increased proportion. Additionally, when a negative electrode is produced by using the obtained carbonaceous material, smaller gaps are formed in the carbonaceous material, so that migration of lithium ions in the electrolytic solution may be suppressed. The average particle diameter (D50) of the carbonaceous material obtained from the present invention is preferably 1 μm or more, more preferably 1.5 μm or more, further preferably 1.7 μm or more. On the other hand, when the average particle diameter is 4 μm or less, a small diffusion free path of lithium ions in the particles enables rapid charging and discharging. Furthermore, in lithium ion secondary batteries, it is important to increase an electrode area for improvement of input/output characteristics, and therefore, a coating thickness of an active material applied to a collector plate needs to be reduced at the time of electrode fabrication. To reduce the coating thickness, it is necessary to reduce the particle diameter of the active material. From such a viewpoint, the average particle diameter is preferably 4 μm or less, more preferably 3.5 μm or less, further preferably 3.2 μm or less, particularly preferably 3.1 μm or less, most preferably 2.9 μm or less.

A pulverizing apparatus used for the post-pulverization step is not particularly limited and, for example, a jet mill, a ball mill, a bead mill, a hammer mill, or a rod mill can be used. In terms of the efficiency of pulverization, a system performing pulverization through contact between particles such as a jet mill has a longer pulverization time and a lower volume efficiency, so that a system performing pulverization in the presence of a pulverization media such as a ball mill and a bead mill is preferable, and the use of a bead mill is preferable from the viewpoint of avoiding impurities mixed in from the pulverization media.

By the post-classification step, the average particle diameter of the carbonaceous material can more accurately be adjusted. For example, particles having a particle diameter of 0.5 μm or less can be removed, and coarse particles can be removed.

Although not particularly limited, examples of a classification method can comprise classification using a sieve, wet classification, and dry classification. Examples of wet classifiers can comprise classifiers utilizing principles of gravity classification, inertia classification, hydraulic classification, and centrifugal classification. Examples of dry classifiers can comprise classifiers utilizing principles of sedimentation classification, mechanical classification, centrifugal classification, etc.

In the carbonaceous material of the present invention, an average interplanar spacing $d_{002}$ of the (002) plane calculated by using the Bragg equation according to a wide-angle X-ray diffraction method is 0.36 nm to 0.42 nm, preferably 0.38 nm to 0.4 nm, more preferably 0.382 nm to 0.396 nm. When the average interplanar spacing $d_{002}$ of the (002) plane is too small, the resistance may become large when lithium ions are inserted into the carbonaceous material, and the resistance at the time of output may become large, so that input/output characteristics for a lithium ion secondary battery may deteriorate. Moreover, since the carbonaceous material repeatedly expands and shrinks, stability for the electrode material may be impaired. When the average interplanar spacing $d_{002}$ is too large, the volume of the carbonaceous material becomes large although the diffusion resistance of lithium ions becomes small, so that an effective capacity per volume may be reduced. The carbonaceous material obtained by the production method of the present invention also preferably has the average interplanar spacing $d_{002}$ of in the range.

A method of adjusting the average interplanar spacing to the range is not limited at all and, for example, the calcining temperature of the carbon precursor resulting in the carbonaceous material may be set in the range of 800 to 1400° C. A method of mixing and calcining with a thermally decomposable resin such as polystyrene can also be used.

A nitrogen element content contained in the carbonaceous material of the present invention is preferably as small as possible and usually has an analysis value obtained from elemental analysis of preferably 0.3 mass % or less, more preferably 0.28 mass % or less, further preferably 0.25 mass % or less, further preferably 0.2 mass % or less, particularly preferably 0.18 mass % or less. It is further preferable that the nitrogen element is not substantially contained in the carbonaceous material. As used herein, "not substantially contained" means that the content is equal to or less than $10^{-6}$ mass %, which is a detection limit of an elemental analysis method (inert gas fusion-thermal conductimetry) described later. If the nitrogen element content is too large, lithium ions and nitrogen react with each other and lithium ions are consumed, thereby not only reducing the utilization efficiency of lithium ions but also causing a reaction with oxygen in air during storage in some cases. The carbonaceous material obtained by the production method of the present invention also preferably has the nitrogen element content in the range.

A method of adjusting the nitrogen element content to the range is not limited at all and, for example, the plant-derived char can be subjected to gas-phase demineralization by a method comprising a step of heat treatment at 500° C. to 940° C. in an inert gas atmosphere containing a halogen compound, or the plant-derived char can be mixed and calcined with the volatile organic substance, so as to adjust the nitrogen element content to the range.

An oxygen element content contained in the carbonaceous material obtained in this embodiment is preferably as small as possible and usually has an analysis value obtained from elemental analysis of preferably 2.5 mass % or less, more preferably 2.3 mass % or less, further preferably 2 mass % or less, particularly preferably LS mass % or less, extremely preferably 1 mass % or less, especially preferably 0.6 mass % or less, most preferably 0.55 mass % or less. It is further preferable that the oxygen element is not substantially contained. As used herein, "not substantially contained" means that the content is equal to or less than $10^{-6}$ mass %, which is the detection limit of the elemental analysis method (inert gas fusion-thermal conductimetry) described later. If the oxygen element content is excessively large, lithium ions and oxygen react with each other and lithium ions are consumed, thereby reducing the utilization efficiency of lithium ions. Furthermore, the excessively large oxygen element content not only attracts oxygen and moisture in the air to increase a probability of reaction with the carbonaceous material but also prevents easy desorption when water is adsorbed, resulting in a reduction in the utilization efficiency of lithium ions in some cases. The carbonaceous material obtained by the production method of the present invention also preferably has the oxygen element content in the range.

A method of adjusting the oxygen element content to the range is not limited at all and, for example, the plant-derived char can be subjected to gas-phase demineralization by a method comprising a step of heat treatment at 500° C. to 940° C. in an inert gas atmosphere containing a halogen compound, or the plant-derived char can be mixed and calcined with the volatile organic substance, so as to adjust the oxygen element content to the range.

From the viewpoints of increasing the dedoping capacity and decreasing the non-dedoping capacity, the potassium element content contained in the carbon precursor obtained in this embodiment is preferably 0.1 mass % or less, more preferably 0.05 mass % or less, further preferably 0.03 mass % or less, particularly preferably 0.01 mass % or less, especially preferably 0.005 mass % or less. From the viewpoints of increasing the dedoping capacity and decreasing the non-dedoping capacity, the iron element content contained in the carbonaceous material obtained in this embodiment is preferably 0.02 mass % or less, more preferably 0.015 mass % or less, further preferably 0.01 mass % or less, particularly preferably 0.006 mass % or less, especially preferably 0.004 mass % or less. The content is particularly preferably 0.005 mass % or less and especially preferably 0.003 mass % or less. When the contents of the potassium element and/or the iron element contained in the carbonaceous material are not more than the upper limit values described above, the dedoping capacity increases, and the dedoping capacity tends to decrease, in a non-aqueous electrolyte secondary battery using the carbonaceous material. Furthermore, when the contents of the potassium element and/or the iron element contained in the carbonaceous material are not more than the upper limit values described above, a short circuit is restrained from occurring due to reprecipitation of these metal elements eluted into the electrolytic solution, so that the safety of the non-aqueous electrolyte secondary battery can be ensured. It is particularly preferable that the carbonaceous material does not substantially contain the potassium element or the iron element. Measurement of the contents of the potassium element and the iron element can be performed as described above. The potassium element content and the iron element content contained in the carbonaceous material are usually 0 mass % or more. The potassium element content and the iron element content contained in the carbonaceous material tend to become lower when the potassium element content and the iron element content contained in the carbon precursor are smaller. The carbonaceous material obtained by the production method of the present invention also preferably has the potassium element content and/or the iron element content in the range.

In the carbonaceous material of the present invention, from the viewpoint of increasing the capacity per mass of the battery, a true density $\rho_{Bt}$ according to the butanol method is preferably 1.4 to 1.7 g/cm$^3$, more preferably 1.42 to 1.65 g/cm$^3$, further preferably 1.44 to 1.6 g/cm$^3$. The plant-derived char carbon precursor having such a true density $\rho_{Bt}$ can be produced by calcining a plant raw material at 800 to 1400° C., for example. Details of the measurement of the true density $\rho_{Bt}$ are as described in Examples, and the true density $\rho_{Bt}$ can be measured by the butanol method according to the method defined in JIS R 7212. The carbonaceous material obtained by the production method of the present invention also preferably has the true density $\rho_{Bt}$ in the range.

The carbonaceous material of the present invention preferably has Lc (in a hexagonal carbon layer stack direction) of 3 nm or less from the viewpoint of repetitive characteristics in doping and dedoping of lithium particularly required for automotive applications etc. Lc is more preferably 0.5 to 2 nm. When Lc exceeds 3 nm, the carbon hexagonal layers are stacked in multiple layers, and the volume expansion/shrinkage accompanying doping/dedoping of lithium may increase. Therefore, the carbon structure is destroyed due to the volume expansion/shrinkage, and the doping/dedoping of lithium is blocked, so that the repetitive characteristics may deteriorate. Details of the measurement of Lc are as described in Examples and Lc can be obtained by using the Scherrer's equation according to the X-ray diffraction method. The carbonaceous material obtained by the production method of the present invention also preferably has Lc within the range.

The average particle diameter (D50) of the carbonaceous material of the present invention is 1 to 4 μm. If the average particle diameter is excessively small, fine powder increases and the specific surface area of the carbonaceous material increases. Consequently, the reactivity between the carbonaceous material and the electrolytic solution becomes higher, and the irreversible capacity increases, so that a proportion of wasted capacity may increase in the positive electrode. The irreversible capacity is a capacity not to be discharged out of the charged capacity of the non-aqueous electrolyte secondary battery. When a negative electrode (electrode) is produced by using a carbonaceous material having an excessively small average particle diameter, smaller gaps are formed in the carbonaceous material, so that migration of lithium in the electrolytic solution is restricted, which is not preferable. The average particle diameter of the carbonaceous material is 1 μm or more, preferably 1.2 μm or more, for example, 1.5 μm or more. When the average particle diameter is 4 μm or less, a small diffusion free path of lithium in the particles enables rapid charging and discharging. Furthermore, in lithium ion secondary batteries, it is important to increase an electrode area for improvement of input/output characteristics, and therefore, a coating thickness of an active material applied to a collector plate needs to be reduced at the time of electrode fabrication. To reduce the coating thickness, it is necessary to reduce the particle diameter of the active material. From such a viewpoint, the upper limit of the average particle diameter is 4 μm or less, preferably 3.5 μm or less, more preferably 3.2 μm or less, further preferably 3 μm or less, particularly preferably 2.8 μm or less. The carbonaceous material obtained by the production method of the present invention also preferably has the average particle diameter (D50) in the range.

An amount of moisture absorption of the carbonaceous material of the present invention is preferably 50,000 ppm or less, more preferably 45,000 ppm or less, further preferably 40,000 ppm or less, furthermore preferably 15,000 ppm or less, especially preferably 14,000 ppm or less, most preferably 8,000 ppm or less. A smaller amount of moisture absorption reduces the moisture adsorbed on the carbonaceous material, increases the lithium ions adsorbed on the carbonaceous material, and is therefore preferable. Additionally, a smaller amount of moisture absorption can reduce the reaction between the adsorbed moisture and the nitrogen atoms of the carbonaceous material and the self-discharge due to the reaction between the adsorbed moisture and lithium ions and is therefore preferable. The amount of moisture absorption of the carbonaceous material can be decreased by reducing the amounts of nitrogen atoms and oxygen atoms contained in the carbonaceous material, for example. The amount of moisture absorption of the carbonaceous material can be measured by using Karl Fischer, for example. The carbonaceous material obtained by the production method of the present invention also preferably has the amount of moisture absorption in the range.

(Negative Electrode for Non-Aqueous Electrolyte Secondary Battery)

A negative electrode for a non-aqueous electrolyte secondary battery of the present invention comprises the carbonaceous material for a non-aqueous electrolyte secondary battery of the present invention. The carbonaceous material obtained by the production method of the present invention can be used as the carbonaceous material for a non-aqueous electrolyte secondary battery of the present invention, for example, the negative electrode (electrode) for a non-aqueous electrolyte secondary battery.

A method for producing a negative electrode for a non-aqueous electrolyte secondary battery of the present invention will hereinafter specifically be described. The negative electrode (electrode) of the present invention can be produced by adding a binder to the carbonaceous material of the present invention, adding an appropriate amount of a suitable solvent, kneading the material into an electrode mixture, and then applying and drying the mixture on a collector plate made up of a metal plate etc., before performing pressure forming.

By using the carbonaceous material of the present invention, a highly-conductive electrode can be produced without adding a conductive assistant. For the purpose of imparting higher conductivity, a conductive assistant can be added at the time of preparation of the electrode mixture as needed. Conductive carbon black, vapor-grown carbon fibers (VGCF), nanotube, etc. can be used as the conductive assistant. Although an addition amount of the conductive assistant varies depending on a kind of the conductive assistant to be used, the expected conductivity may not be obtained if the addition amount is too small, and the dispersion in the electrode mixture may be poor if the amount is too large. From such a viewpoint, a preferable proportion of the conductive assistant to be added is 0.5 to 10 mass % (assuming the amount of the active material (carbonaceous material)+the amount of the binder+the amount of the conductive assistant=100 mass %), more preferably 0.5 to 7 mass %, particularly preferably 0.5 to 5 mass %. The binder may be any binder not reactive with an electrolytic solution, such as PVDF (polyvinylidene fluoride), polytetrafluoroethylene, and a mixture of SBR (styrene-butadiene rubber) and CMC (carboxymethyl cellulose), without particular limitation. Among others, PVDF is preferable since PVDF having adhered to the surface of the active material is less likely to inhibit the lithium ion migration so that favorable input/output characteristics are easily obtained. Although a polar solvent such as N-methylpyrrolidone (NMP) is preferably used for dissolving the PVDF and forming a slurry, an aqueous emulsion such as SBR or CMC dissolved in water can also be used. If the addition amount of the binder is too large, the resistance of the obtained electrode becomes large, so that an increased internal resistance of the battery may deteriorate the battery performance. On the other hand, if the addition amount of the binder is too small, bonding between the particles of the negative electrode material and with the collector plate may be insufficient. Although a preferable addition amount of the binder varies depending on a kind of the binder to be used, for example, the addition amount of the PVDF-based binder preferably is 3 to 13 mass %, more preferably 3 to 10 mass %. On the other hand, when water is used as a solvent of the binder, a plurality of binders is often mixed and used as in the case of a mixture of SBR and CMC, and the total amount of all the binders to be used is preferably 0.5 to 5 mass %, more preferably 1 to 4 mass %.

An electrode active material layer is basically formed on both sides of the collector plate or may be formed on one side as necessary. The thicker electrode active material layer is preferable for higher capacity since the collector plate, a separator, etc. can be reduced. However, a wider electrode area opposed to a counter electrode is more advantageous for improvement of the input/output characteristics, and therefore, when the electrode active material layer is too thick, the input/output characteristics may deteriorate. From the viewpoint of output during battery discharge, a preferable thickness of the active material layer (per one side) is preferably 10 to 80 µm, more preferably 20 to 75 µm, further preferably 20 to 60 µm.

(Non-Aqueous Electrolyte Secondary Battery)

A non-aqueous electrolyte secondary battery of the present invention comprises the negative electrode for a non-aqueous electrolyte secondary battery of the present invention. By using the negative electrode for a non-aqueous electrolyte secondary battery produced by the production method of the present invention, the non-aqueous electrolyte secondary battery can be provided. The non-aqueous electrolyte secondary battery of the present invention has favorable discharge capacity and favorable resistance to oxidative deterioration. The non-aqueous electrolyte secondary battery of the present invention has favorable resistance to oxidative deterioration, suppresses an increase in irreversible capacity due to inactivation of lithium ions, and can maintain high charge/discharge efficiency. A non-aqueous electrolyte secondary battery using the negative electrode for a non-aqueous electrolyte secondary battery using the carbonaceous material of the present invention or the carbonaceous material obtained by the production method of the present invention exhibits excellent output characteristics and excellent cycle characteristics.

If the negative electrode for a non-aqueous electrolyte secondary battery is formed by using the carbonaceous material of the present invention or the carbonaceous material obtained by the production method of the present invention, various materials conventionally used or proposed for non-aqueous electrolyte secondary batteries can be used for other materials constituting the battery, such as a positive electrode material, the separator, and the electrolytic solution, without particular limitation.

For example, for the positive electrode material, layered oxide-based (represented by $LiMO_2$, where M is metal: e.g., $LiCoO_2$, $LiNiO_2$, $LiMnO_2$, or $LiNi_xCo_yMo_zO_2$ (x, y, and z represent composition ratios)), olivine-based (represented by $LiMPO_4$, where M is metal: e.g., $LiFePO_4$), and spinel-based (represented by $LiM_2O_4$, where M is metal: e.g., $LiMn_2O_4$) composite metal chalcogen compounds are preferable, and these chalcogen compounds may be mixed as needed. The positive electrode is formed by shaping these positive electrode materials together with a suitable binder and a carbon material for imparting conductivity to an electrode such that a layer is formed on the conductive collector plate.

A non-aqueous solvent type electrolyte solution used in combination with these positive and negative electrodes is generally formed by dissolving an electrolyte in a non-aqueous solvent. For the non-aqueous solvent, for example, one or more organic solvents such as propylene carbonate, ethylene carbonate, dimethyl carbonate, diethyl carbonate, dimethoxyethane, diethoxyethane, γ-butyrolactone, tetrahydrofuran, 2-methyltetrahydrofuran, sulfolane, or 1,3-dioxolane can be used alone or in combination. For the electrolyte, $LiClO_4$, $LiPF_6$, $LiBF_4$, $LiCF_3SO_3$, $LiAsF_6$, LiCl, LiBr, $LiB(C_6H_5)_4$, or $LiN(SO_3CF_3)_2$ is used.

The non-aqueous electrolyte secondary battery is generally formed by immersing in the electrolytic solution the positive electrode and the negative electrode formed as described above and opposed to each other across a liquid-permeable separator made of nonwoven fabric or other porous materials as needed. For the separator, a permeable separator made of nonwoven fabric normally used for a secondary battery or other porous materials can be used. Alternatively, a solid electrolyte made of polymer gel impregnated with an electrolytic solution may be used instead of, or together with, the separator.

The carbonaceous material for a non-aqueous electrolyte secondary battery of the present invention or the carbonaceous material for a non-aqueous electrolyte secondary battery obtained by the production method of the present invention is suitable for a carbonaceous material for a battery (typically, a non-aqueous electrolyte secondary battery for driving a vehicle) mounted on a vehicle such as an automobile. In the present invention, the vehicle refers to a vehicle generally known as an electric vehicle, a hybrid vehicle with a fuel cell and an internal combustion engine, etc. without particular limitation; however, the vehicle at least comprises a power source device provided with the battery, an electric drive mechanism driven by power supply from the power source device, and a control device controlling this mechanism. The vehicle may further comprise a mechanism provided with a power generation brake and a regenerative brake and converting energy from braking into electricity to charge the non-aqueous electrolyte secondary battery.

EXAMPLES

The present invention will hereinafter specifically be described with examples; however, the present invention is not limited to these examples. A method for measuring physical property values of the carbonaceous material for a non-aqueous electrolyte secondary battery will hereinafter be described; however, the physical property values described in this description comprising the examples are based on values obtained by the following method.

(Measurement of Specific Surface Area by Nitrogen Adsorption BET Three-Point Method)

An approximate expression (Eq. (II)) derived from the BET equation is described below.

[Mathematical 2]

$$p/[v(p_0-p)]=(1/v_mc)+[(c-1)/v_mc](p/p_0) \quad \text{(II)}$$

By using the approximate expression, $v_m$ was obtained by a three-point method according to nitrogen adsorption at liquid nitrogen temperature, and a specific surface area of a sample was calculated by following Eq. (III).

[Mathematical 3]

$$\text{specific surface area} = \left(\frac{v_mNa}{22400}\right) \times 10^{-18} \quad \text{(III)}$$

In the examples, $v_m$ is the adsorption amount (cm³/g) required for forming a monomolecular layer on a sample surface, v is the actually measured adsorption amount (cm³/g), $p_0$ is the saturated vapor pressure, p is the absolute pressure, c is the constant (reflecting the adsorption heat), N is the Avogadro's number $6.022 \times 10^{23}$, and a (nm²) is the area occupied by adsorbate molecules on the sample surface (molecular occupied cross-sectional area).

Specifically, the adsorption amount of nitrogen to the sample at liquid nitrogen temperature was measured by using "BELL Sorb Mini" manufactured by BEL Japan as follows. After the sample was filled in a sample tube, the sample tube cooled to −196° C. was once depressurized before nitrogen (purity 99.999%) was adsorbed to the sample at a desired relative pressure. An adsorbed gas amount v was defined as an amount of nitrogen adsorbed to the sample when the equilibrium pressure was reached at each desired relative pressure.

(Measurement of Average Interplanar Spacing $d_{002}$ Using Bragg Equation According to Wide-Angle X-Ray Diffraction Method)

By using "MiniFlex II manufactured by Rigaku Corporation", carbonaceous material powder was filled in a sample holder and the CuKα ray monochromatized by an Ni filter was used as a radiation source to obtain an X-ray diffraction pattern. A peak position of the diffraction pattern was obtained by a gravity center method (a method of obtaining a gravity center position of a diffraction line to obtain a peak position with a 2θ value corresponding thereto) and was corrected by using a diffraction peak of the (111) plane of high purity silicon powder for standard material. A wavelength λ of the CuKα ray was set to 0.15418 nm, and $d_{002}$ was calculated according to the Bragg formula (Eq. (IV)) described below.

[Mathematical 4]

$$d_{002} = \frac{\lambda}{2 \cdot \sin\theta} \text{(Bragg formula)} \quad \text{(IV)}$$

(Elemental Analysis)

Elemental analysis was performed by using the oxygen/nitrogen/hydrogen analyzer EMGA-930 manufactured by HORIBA, Ltd.

The detection methods of the apparatus are oxygen: inert gas fusion-non-dispersive infrared absorption method (NDIR), nitrogen: inert gas fusion-thermal conductivity method (TCD), and hydrogen: inert gas fusion-non-dispersive infrared absorption method (NDIR) calibrated with an (oxygen/nitrogen) Ni capsule, TiH$_2$ (H standard sample), and SS-3 (N, O standard sample), and 20 mg of a sample having moisture content measured at 250° C. for about 10 minutes for a pretreatment was put into an Ni capsule and measured after 30 seconds of degasification in the analyzer. The test was performed by analyzing three specimens, and an average value was used as an analysis value.

(Measurement of Residual Carbon Ratio)

The residual carbon ratio was measured by quantifying a carbon content of an ignition residue after ignition of a sample in an inert gas. With regard to the ignition, about 1 g of a volatile organic substance (the accurate mass is defined as $W_1$ (g)) was put into a crucible and the crucible was heated in an electric furnace at the temperature increase rate of 10° C./min from ordinary temperature to 800° C. while flowing 20 liters of nitrogen per minute and was then ignited at 800° C. for 1 hour. A residue in this case was defined as the ignition residue, and the mass thereof was defined as $W_2$ (g).

Subsequently, for the ignition residue, elemental analysis was performed in accordance with the method defined in JIS M 8819 to measure a mass proportion $P_1$ (%) of carbon. A residual carbon ratio $P_2$ (mass %) was calculated by Eq. 1 described above.

(Measurement of True Density by Butanol Method)

The true density $\rho_{Bt}$ was measured by the butanol method according to the method defined in JIS R 7212. A mass ($m_1$) of a pycnometer with a side tube having an inner volume of about 40 mL was accurately measured. Subsequently, a sample was placed flatly on a bottom portion thereof to a thickness of about 10 mm, and a mass ($m_2$) thereof was accurately measured. To this sample, 1-Butanol was gently added such that the depth from the bottom was about 20 mm. Subsequently, after applying mild vibrations to the pycnometer and confirming that large bubbles were no longer generated, the pycnometer was placed in a vacuum desiccator and gradual evacuation was performed to 2.0 to 2.7 kPa. After the pressure was kept for 20 minutes or more and the generation of bubbles was stopped, the pycnometer was removed, filled with 1-butanol, plugged, and placed in a constant temperature water bath (adjusted to 30±0.03° C.) for 15 minutes or more with the liquid surface of 1-butanol being aligned with a marked line. After the pycnometer was taken out and the exterior portion thereof was sufficiently wiped, cooling to ordinary temperature was followed by accurate measurement of a mass ($m_4$). Subsequently, the same pycnometer was filled only with 1-butanol and placed in the constant temperature water bath as described above, and a mass ($m_3$) was measured after alignment with the marked line. Distilled water with dissolved gas being removed by boiling immediately before use was taken in the pycnometer, which was then placed in the constant temperature water bath as described above, and a mass ($m_5$) was measured after alignment with the marked line. The true density $\rho_{Bt}$ was calculated by following Eq. (V). In this equation, d is the specific gravity (0.9946) of water at 30° C.

[Mathematical 5]

$$\rho_{Bt} = \frac{m_2 - m_1}{m_2 - m_1 - (m_4 - m_3)} \times \frac{m_3 - m_1}{m_5 - m_1} d \quad \text{(V)}$$

(Measurement of Average Particle Diameter by Laser Scattering Method)

The average particle diameter (particle size distribution) of the plant-derived char and the carbonaceous material was measured by the following method. The sample was put into an aqueous solution containing 0.3 mass % surfactant ("Toriton X100" manufactured by Wako Pure Chemical Industries), treated by an ultrasonic cleaner for 10 minutes or more, and dispersed in the aqueous solution. The particle size distribution was measured by using this dispersion. Particle size distribution measurement was performed by using a particle diameter/particle size distribution measuring device ("Microtrac MT3000" manufactured by Nikkiso). D50 is the particle diameter at which the cumulative volume is 50%, and this value was used as the average particle diameter.

(Metal Content Measurement)

With regard to a method for measuring potassium element content and iron element content, the following method was used for the measurement. A carbon sample containing predetermined potassium element and iron element was prepared in advance to create calibration curves for a relation between the potassium Kα ray intensity and the potassium element content and a relation between the iron Kα ray intensity and the iron element content, using fluorescent X-ray analyzer. Then, the intensities of the potassium Kα ray and the iron Kα ray in fluorescent X-ray analysis of the sample were measured to obtain the potassium element content and the iron element content from the calibration curves created in advance. The fluorescent X-ray analysis was performed under the following conditions by using LAB CENTER XRF-1700 manufactured by Shimadzu Corporation. A holder for an upper irradiation method was used and a sample measurement area was set within a circumference of 20 mm in diameter. For setting a sample to be measured, 0.5 g of the sample to be measured was placed in a polyethylene container having an inner diameter of 25 mm with the back being pressed by a plankton net, and a measurement surface was covered with polypropylene film when measurement was performed. The X-ray source was set to 40 kV and 60 mA. Potassium was measured by using LiF (200) as a dispersive crystal and a gas flow type proportional counter tube as a detector in the range of 2θ of 90° to 140° at a scanning speed of 8°/min. Iron was measured by using LiF (200) as a dispersive crystal and a scintillation counter as a detector in the range of 2θ of 56° to 60° at a scanning speed of 8°/min.

(Measurement of Amount of Moisture Absorption)

Ten grams of the sample was put into a sample tube and preliminarily dried at 120° C. for two hours under the reduced pressure of 133 Pa and was transferred to a glass petri dish of 50 mm in diameter and exposed in a constant temperature and humidity chamber at 25° C. and the humidity of 50% for a predetermined time. Subsequently, 1 g of the sample was weighed and taken and then heated to 250° C. in Karl Fischer (manufactured by Mitsubishi Chemical Analytech) to measure an amount of moisture absorption under a nitrogen gas stream.

Preparation Example 1

Coconut shell was crushed and dry distilled at 500° C. to obtain a coconut shell char having a particle diameter of 2.360 to 0.850 mm (containing 98 mass % of particles having a particle diameter of 2.360 to 0.850 mm). A gas-phase demineralization treatment was performed for 100 g of this coconut shell char at 900° C. for 50 minutes while supplying a nitrogen gas containing 1 vol % hydrogen chloride gas at a flow rate of 10 L/min. Subsequently, only the supply of the hydrogen chloride gas was stopped, and a gas-phase deacidification treatment was further performed at 900° C. for 30 minutes while supplying the nitrogen gas at a flow rate of 10 L/min to obtain a carbon precursor.

The obtained carbon precursor was pulverized by using a dry bead mill (ball mill) (SDAS manufactured by Ashizawa Finetech) under conditions of a bead diameter of 3 mm, a bead filling rate of 75%, and a raw material feed amount of 1 kg/Hr to obtain a carbon precursor (1) having an average particle diameter of 2.5 μm and a specific surface area of 467 m$^2$/g.

Preparation Example 2

A carbon precursor (2) having an average particle diameter of 1.8 μm and a specific surface area of 484 m$^2$/g was obtained as in Preparation Example 1 except that the raw material feed amount was changed to 0.5 kg/Hr.

Preparation Example 3

A carbon precursor (3) having an average particle diameter of 4.2 μm and a specific surface area of 401 m$^2$/g was obtained as in Preparation Example 1 except that the raw material feed amount was changed to 1.3 kg/Hr.

Preparation Example 4

A carbon precursor (4) having an average particle diameter of 0.7 μm and a specific surface area of 581 m$^2$/g was obtained as in Preparation Example 1 except that the raw material feed amount was changed to 0.2 kg/Hr.

Preparation Example 5

A carbon precursor (5) having an average particle diameter of 5.5 μm and a specific surface area of 392 m$^2$/g was obtained as in Preparation Example 1 except that the raw material feed amount was changed to 1.63 kg/Hr.

Example 1

In a high-speed temperature rising furnace manufactured by Motoyama, 10 g of the carbon precursor (1) prepared in Preparation Example 1 and placed in a graphite setter (a graphite sheath) (100 mm in length, 100 mm in width, 50 mm in height) was elevated in temperature to 1290° C. (calcining temperature) at a heat rising rate of 60° C. per minute under a nitrogen flow rate of 5 L per minute and was then held for 23 minutes before natural cooling. After confirming that the furnace temperature had decreased to 100° C. or less, a carbonaceous material (1) was taken out from the furnace. The mass of the recovered carbonaceous material (1) was 9.1 g, and the recovery rate to the carbon precursor (1) was 91%. Physical properties of the obtained carbonaceous material (1) are shown in Table 1.

Example 2

A carbonaceous material (2) was obtained as in Example 1 except that the carbon precursor (2) prepared in Preparation Example 2 was used instead of the carbon precursor (1). The recovery amount was 9.1 g, and the recovery rate was 91%. Physical properties of the obtained carbonaceous material (2) are shown in Table 1.

Example 3

With 9.1 g of the carbon precursor (5) prepared in Preparation Example 5, 0.9 g of polystyrene (manufactured by Sekisui Plastics and having an average particle diameter of 400 μm and a residual carbon ratio of 1.2 mass %) was mixed. In a high-speed temperature rising furnace manufactured by Motoyama, 10 g of this mixture placed in a graphite setter (100 mm in length, 100 mm in width, 50 mm in height) was elevated in temperature to 1290° C. at a heat rising rate of 60° C. per minute under a nitrogen flow rate of 5 L per minute and was then held for 23 minutes before natural cooling. After confirming that the furnace temperature had decreased to 100° C. or less, a carbonaceous material was taken out from the furnace. The mass of the recovered carbonaceous material was 8.1 g, and the recovery rate to the carbon precursor was 91%.

The obtained carbonaceous material was placed in an 80 mL zirconia container filled with zirconia beads having a bead diameter of 5 mm and was pulverized by repeating a step of rotating at 400 rpm for 5 minutes and then stopping for 1 minute 15 times by using a dry ball mill (P-6 manufactured by Fritsch) to obtain a carbonaceous material (3) having an average particle diameter of 2.9 μm. Physical properties of the obtained carbonaceous material (3) are shown in Table 1.

Example 4

In a high-speed temperature rising furnace manufactured by Motoyama, 10 g of the carbon precursor (5) prepared in Preparation Example 5 and placed in a graphite setter (100 mm in length, 100 mm in width, 50 mm in height) was elevated in temperature to 1290° C. at a heat rising rate of 60° C. per minute under a nitrogen flow rate of 5 L per minute and was then held for 23 minutes before natural cooling. After confirming that the furnace temperature had decreased to 100° C. or less, a carbonaceous material was taken out from the furnace. The mass of the recovered carbonaceous material was 9.1 g, and the recovery rate to the carbon precursor was 91%.

The obtained carbonaceous material was placed in an 80 mL zirconia container filled with zirconia beads having a bead diameter of 5 mm and was pulverized by repeating a step of rotating at 400 rpm for 5 minutes and then stopping for 1 minute 15 times by using a ball mill (P-6 manufactured by Fritsch) to obtain a carbonaceous material (4). Physical properties of the obtained carbonaceous material (4) are shown in Table 1.

Comparative Example 1

A carbonaceous material (5) was obtained as in Example 1 except that the calcining temperature was changed to 1370° C. The recovery amount was 9.2 g, and the recovery rate was 92%. Physical properties of the obtained carbonaceous material (5) are shown in Table 1.

Comparative Example 2

A carbonaceous material (6) was obtained as in Example 1 except that the calcining temperature was changed to 1200° C. The recovery amount was 9.1 g, and the recovery rate was 91%. Physical properties of the obtained carbonaceous material (6) are shown in Table 1.

Comparative Example 3

A carbonaceous material (7) was obtained as in Example 1 except that the carbon precursor (5) was used instead of the carbon precursor (1). The recovery amount was 9.1 g, and the recovery rate was 91%. Physical properties of the obtained carbonaceous material (7) are shown in Table 1.

Comparative Example 4

A carbonaceous material (8) was obtained as in Example 1 except that the carbon precursor (6) was used instead of the carbon precursor (1). The recovery amount was 9.2 g, and the recovery rate was 92%. Physical properties of the obtained carbonaceous material (8) are shown in Table 1.

Comparative Example 5

A carbonaceous material (9) was obtained as in Example 3 except that the carbon precursor (5) prepared in Preparation Example 5 was not pulverized after firing. Physical properties of the obtained carbonaceous material (9) are shown in Table 1.

Comparative Example 6

A carbonaceous material (10) was obtained as in Example 3 except that the number of repetitions of the process of rotating for 5 minutes and then stopping for 1 minute in the dry ball mill was changed to 20 times. Physical properties of the obtained carbonaceous material (10) are shown in Table 1.

Comparative Example 7

A carbonaceous material (11) was obtained as in Example 4 except that the carbon precursor (5) prepared in Preparation Example 5 was not pulverized after firing. Physical properties of the obtained carbonaceous material (11) are shown in Table 1.

TABLE 1

| | | $d_{002}$ (nm) | specific surface area ($m^2/g$) | average particle diameter (μm) | nitrogen element content (mass %) | oxygen element content (mass %) | true density ($g/cm^3$) | amount of moisture absorption (ppm) | K element content (ppm) | Fe element content (ppm) |
|---|---|---|---|---|---|---|---|---|---|---|
| Examples | 1 | 0.389 | 42 | 2.5 | 0.14 | 0.45 | 1.50 | 32448 | 27 | 16 |
| | 2 | 0.388 | 45 | 1.8 | 0.13 | 0.51 | 1.50 | 35559 | 35 | 19 |
| | 3 | 0.389 | 27 | 2.9 | 0.17 | 1.99 | 1.50 | 27445 | 32 | 17 |
| | 4 | 0.386 | 45 | 2.9 | 0.17 | 1.79 | 1.50 | 31146 | 27 | 18 |
| Comparative Examples | 1 | 0.389 | 17 | 2.5 | 0.15 | 0.45 | 1.49 | 30812 | 35 | 20 |
| | 2 | 0.389 | 66 | 2.5 | 0.14 | 0.78 | 1.49 | 35316 | 36 | 18 |
| | 3 | 0.389 | 42 | 4.2 | 0.15 | 0.59 | 1.46 | 29566 | 36 | 17 |
| | 4 | 0.389 | 42 | 0.7 | 0.15 | 1.77 | 1.49 | 44112 | 35 | 17 |
| | 5 | 0.389 | 5 | 5.5 | 0.14 | 0.47 | 1.47 | 4913 | 32 | 17 |
| | 6 | 0.389 | 80 | 0.9 | 0.14 | 2.55 | 1.51 | 51222 | 31 | 18 |
| | 7 | 0.389 | 7 | 5.5 | 0.14 | 0.59 | 1.47 | 5412 | 32 | 18 |

(Fabrication of Electrode)

By using the carbonaceous materials (1) to (11) obtained in Examples 1 and 4 and Comparative Examples 1 to 7, respective electrodes (negative electrodes) were fabricated according to the following procedure.

A slurry was obtained by mixing 92 parts by mass of the prepared carbonaceous material, 2 parts by mass of acetylene black, 6 parts by mass of PVDF (polyvinylidene fluoride), and 90 parts by mass of NMP (N-methylpyrrolidone). The obtained slurry was applied to a copper foil having a thickness of 14 μm, dried, and then pressed to obtain respective electrodes (1) to (11) having a thickness of 60 μm. The obtained electrodes (1) to (11) had a density of 0.9 to 1.1 $g/cm^3$.

(Measurement of Charge Capacity, Discharge Capacity, Charge/Discharge Efficiency, and Initial DC Resistance)

The electrodes (1) to (11) fabricated as described above were used as working electrodes while metal lithium was used as counter electrodes and reference electrodes. For a solvent, a mixture of ethylene carbonate and methylethyl carbonate (volume ratio 3:7) were used. In this solvent, 1 mol/L of $LiPF_6$ was dissolved and used as an electrolyte. A glass fiber nonwoven fabric was used for the separator. Respective coin cells were fabricated in a glove box under an argon atmosphere.

For the lithium ion secondary batteries having the structure described above, a charge/discharge test was performed by using a charge/discharge test apparatus ("TOSCAT" manufactured by Toyo System). The initial DC resistance was defined as a resistance value generated when 0.5 mA was applied for 3 seconds. Doping of lithium was performed at a rate of 70 mA/g with respect to the active material mass, and doping was performed to 1 mV with respect to lithium potential. A constant voltage of 1 mV relative to the lithium potential was further applied for 8 hours before terminating the doping. A capacity (mAh/g) at this point was defined as the charge capacity. Subsequently, dedoping was performed at a rate of 70 mA/g with respect to the active material mass to 2.5 V relative to the lithium potential, and a capacity discharged at this point was defined as the discharge capacity. The percentage of the discharge capacity/charge capacity was defined as the charge/discharge efficiency (charge/discharge efficiency) and was used as an index of the utilization efficiency of lithium ions in the battery. The obtained battery performance is shown in Table 2.

TABLE 2

|  |  | charge capacity (mAh/g) | discharge capacity (mAh/g) | charge/ discharge efficiency (%) | initial DC resistance (Ω) |
|---|---|---|---|---|---|
| Examples | 1 | 443 | 340 | 77 | 377 |
|  | 2 | 442 | 344 | 78 | 357 |
|  | 3 | 441 | 352 | 80 | 343 |
|  | 4 | 436 | 340 | 76 | 316 |
| Comparative Examples | 1 | 421 | 337 | 80 | 402 |
|  | 2 | 466 | 349 | 75 | 501 |
|  | 3 | 443 | 345 | 78 | 612 |
|  | 4 | 451 | 324 | 72 | 551 |
|  | 5 | 386 | 336 | 87 | 899 |
|  | 6 | 458 | 321 | 70 | 250 |
|  | 7 | 391 | 325 | 83 | 812 |

From Table 2, in the results from the lithium ion secondary batteries fabricated by using the carbonaceous materials obtained in Examples 1 to 4, a high charge capacity and a high discharge capacity were obtained at the same time, and furthermore, the charge/discharge efficiency was excellent. In Examples 1 to 4, the initial DC resistance was low. As a result, it is clear that the non-aqueous electrolyte secondary battery using the negative electrode containing the carbonaceous material of the present invention exhibits favorable charge/discharge capacities as well as low resistance.

The invention claimed is:

1. A carbonaceous material for a non-aqueous electrolyte secondary battery, having an average interplanar spacing $d_{002}$ of the (002) plane of from 0.36 to 0.42 nm calculated by using the Bragg equation according to a wide-angle X-ray diffraction method, a specific surface area of from 20 to 65 $m^2/g$ obtained by a nitrogen adsorption BET three-point method, a nitrogen element content of 0.3 mass % or less, an oxygen element content of 2.5 mass % or less, and an average particle diameter of from 1 to 4 μm according to a laser scattering method, and a true density of from 1.4 to 1.7 $g/cm^3$ obtained by a butanol method.

2. The carbonaceous material according to claim 1, wherein the carbonaceous material has a potassium element content of 0.1 mass % or less and an iron element content of 0.02 mass % or less.

3. A negative electrode for a non-aqueous electrolyte secondary battery, comprising the carbonaceous material according to claim 1.

4. A non-aqueous electrolyte secondary battery, comprising the negative electrode according to claim 3.

5. A method for producing a carbonaceous material for a non-aqueous electrolyte secondary battery, the method comprising:
    calcining a carbon precursor or a mixture of the carbon precursor and a volatile organic substance under an inert gas atmosphere at 800 to 1400° C.,
    wherein the carbonaceous material for a non-aqueous electrolyte secondary battery has an average interplanar spacing $d_{002}$ of the (002) plane of from 0.36 to 0.42 nm calculated by using the Bragg equation according to a wide-angle X-ray diffraction method, a specific surface area of from 20 to 65 $m^2/g$ obtained by a nitrogen adsorption BET three-point method, a nitrogen element content of 0.3 mass % or less, an oxygen element content of 2.5 mass % or less, an average particle diameter of from 1 to 4 μm according to a laser scattering method, and a true density of from 1.4 to 1.7 $g/cm^3$ obtained by a butanol method.

6. The method for producing a carbonaceous material for a non-aqueous electrolyte secondary battery according to claim 5, comprising:
    the calcining step, and
    a post-pulverization step, a post-classification step, or both, of adjusting the specific surface area of the carbonaceous material obtained by a nitrogen adsorption BET three-point method to 20 to 75 $m^2/g$ through pulverization, classification, or both.

7. The method according to claim 5, further comprising a pre-pulverization step, a pre-classification step, or both, of adjusting the specific surface area of the carbon precursor obtained by a nitrogen adsorption BET three-point method to 100 to 800 $m^2/g$ through pulverization, classification, or both.

8. The method according to claim 5, wherein the carbon precursor is derived from a plant.

9. The method according to claim 5, wherein the volatile organic substance is in a solid state at ordinary temperature and has a residual carbon ratio of less than 5 mass %.

10. The method according to claim 5, wherein the carbonaceous material has an average interplanar spacing $d_{002}$ of the (002) plane within a range of 0.36 to 0.42 nm calculated by using the Bragg equation according to a wide-angle X-ray diffraction method, a nitrogen element content of 0.3 mass % or less, an oxygen element content of 2.5 mass % or less, and an average particle diameter of 1 to 4 μm according to a laser scattering method.

11. The method according to claim 5, wherein the carbonaceous material has a potassium element content of 0.1 mass % or less and an iron element content of 0.02 mass % or less.

* * * * *